(12) United States Patent
Cavin et al.

(10) Patent No.: US 10,848,753 B1
(45) Date of Patent: Nov. 24, 2020

(54) EYE-TRACKING SYSTEM USING A SCANNING LASER ASSEMBLY

(71) Applicant: Facebook Technologies, LLC, Menlo Park, CA (US)

(72) Inventors: Robert Dale Cavin, Kirkland, WA (US); Alexander Jobe Fix, Seattle, WA (US); Andrew John Ouderkirk, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 46 days.

(21) Appl. No.: 15/994,240

(22) Filed: May 31, 2018

(51) Int. Cl.
| | |
|---|---|
| *G06F 3/01* | (2006.01) |
| *H04N 13/383* | (2018.01) |
| *H04N 13/332* | (2018.01) |
| *G02B 26/08* | (2006.01) |
| *G02B 27/01* | (2006.01) |

(52) U.S. Cl.
CPC ........... *H04N 13/383* (2018.05); *G02B 26/08* (2013.01); *G02B 27/0172* (2013.01); *G06F 3/013* (2013.01); *H04N 13/332* (2018.05)

(58) Field of Classification Search
CPC .... H04N 13/383; H04N 13/332; G02B 26/08; G02B 27/0172; G06F 3/013
USPC ............................................................ 345/8
See application file for complete search history.

(56) References Cited

U.S. PATENT DOCUMENTS

| | | | | |
|---|---|---|---|---|
| 9,007,301 | B1 * | 4/2015 | Raffle | G02B 27/017 345/156 |
| 9,335,548 | B1 * | 5/2016 | Cakmakci | G02B 27/0172 |
| 2006/0195014 | A1 * | 8/2006 | Seibel | A61B 1/0008 600/102 |
| 2016/0091720 | A1 * | 3/2016 | Stafford | G02B 27/0172 345/8 |
| 2017/0139211 | A1 * | 5/2017 | Trail | G02B 27/0172 |
| 2018/0129041 | A1 * | 5/2018 | Aleem | G02B 27/0093 |

* cited by examiner

*Primary Examiner* — Chanh D Nguyen
*Assistant Examiner* — Ngan T. Pham-Lu
(74) *Attorney, Agent, or Firm* — Fenwick & West LLP

(57) ABSTRACT

A head-mounted display includes an eye tracking system, implemented to determine the location of the user's gaze, which is configured using a scanning laser assembly, photodetector, and a controller. Light with wavelengths within the infrared range is emitted toward the user's eye from the scanning laser and is reflected off at various emission angles. The reflected light is detected by a photodetector or plurality of photodetectors located along a periphery of the optics block. The photodetector records a signal intensity, determined by the emission angle of the reflected infrared light. The controller, having been previously calibrated to indicate eye movements based on these varying signal intensities, provides information pertaining to the location of the user's eye.

16 Claims, 5 Drawing Sheets

EYE-TRACKING SYSTEM USING A SCANNING LASER ASSEMBLY

BACKGROUND

This disclosure relates generally to eye tracking systems, and specifically relates to an eye tracking system that uses a scanning laser.

Conventional eye tracking systems generally include a plurality of illumination sources and a camera. The plurality of sources create "glints" in a reflection on a cornea of user. Conventional eye tracking systems capture images of the glints, and determine eye position using the captured images. However, the use of illumination sources increase size requirements and/or complexity of conventional eye tracking systems.

SUMMARY

An eye tracking system tracks positions of one or both eyes of a user. The eye tracking system includes a scanning laser assembly, a photodetector assembly, and a controller. The scanning laser assembly includes one or more scanning lasers that are configured to illuminate a portion of an eyebox (i.e., a region in space occupied by an eye of a user) with respective beams of scanned laser light (e.g., raster scanned). The photodetector assembly is configured to detect reflections of the scanned light from an eye in the eyebox (e.g., reflections from a sclera and/or a cornea). The photodetector assembly may be, e.g., one or more photodetectors located to capture portions of the beam of scanned laser light that are reflected from the eye. The controller is configured to estimate a position of the eye using the detected reflections of the scanned laser light.

In some embodiments, the eye tracking system is part of a head-mounted display (HMD). In addition to the eye tracking system, the HMD includes an electronic display, and an optics block. The electronic display panel is configured to emit image light. The optics block includes one or more optical elements and is configured to direct the image light to the eyebox. In some embodiments, the HMD may be part of an artificial reality system.

Figure 1A:
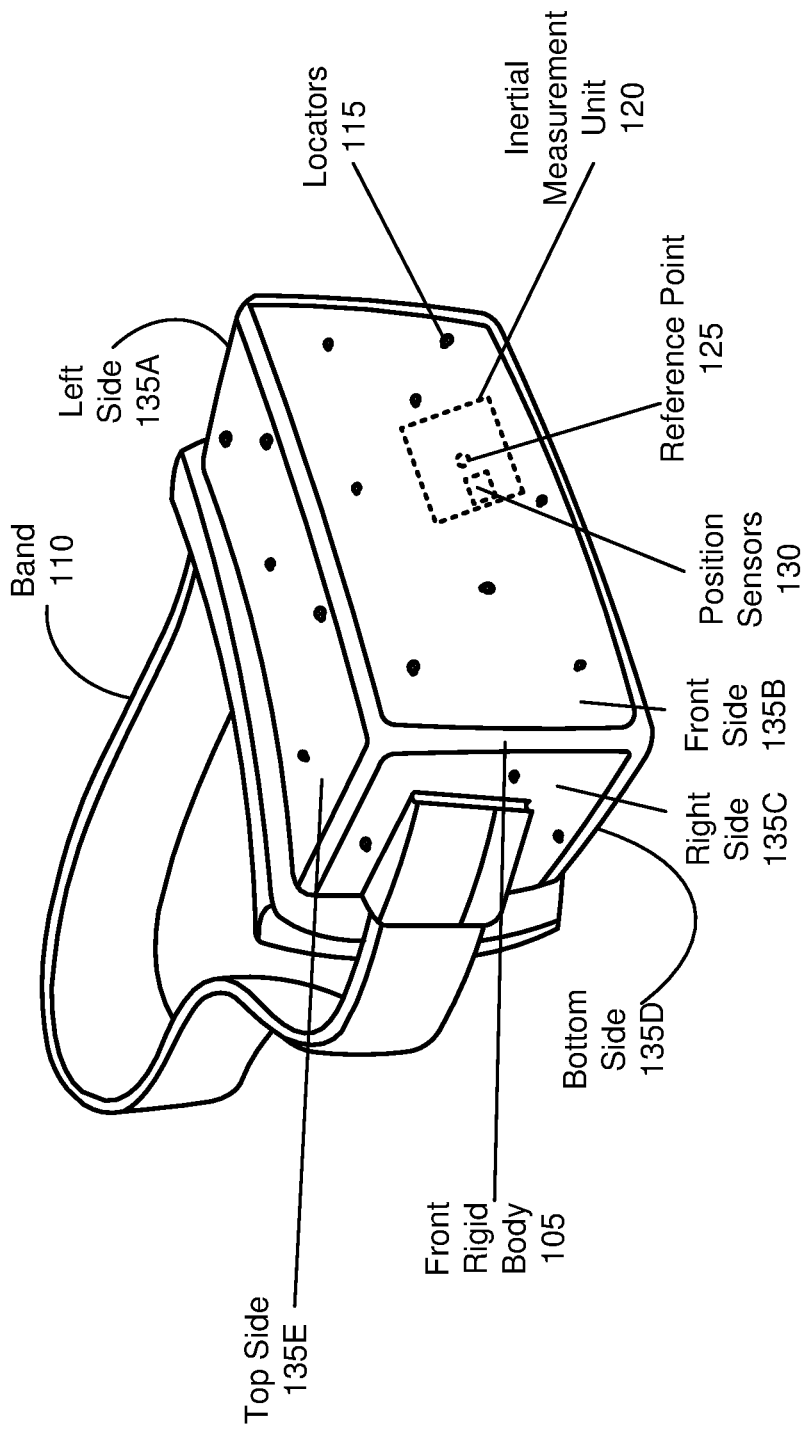
FIG. 1A is a diagram of a head-mounted display (HMD), in accordance with one embodiment.

The figures depict various embodiments of the present disclosure for purposes of illustration only. One skilled in the art will readily recognize from the following discussion that alternative embodiments of the structures and methods illustrated herein may be employed without departing from the principles, or benefits touted, of the disclosure described herein.

DETAILED DESCRIPTION

Configuration Overview

An eye tracking system tracks positions of one or both eyes of a user. The eye tracking system includes a scanning laser assembly, a photodetector assembly, and a controller. For a given eye channel (i.e., left eye or right eye) the scanning laser assembly is configured to illuminate a portion of an eyebox (i.e., a region in space occupied by an eye of a user) with a one or more beams of scanned laser light. The laser light is in an infrared band. The detector (e.g., assembly of photodetectors) is configured to detect reflections of the scanned light from an eye in the eyebox. For example, the reflections may be from a cornea and/or a sclera of the eye. The controller is configured to estimate a position of the eye using the detected reflections of the scanned laser light. In some embodiments, the controller is further configured to generate additional information (e.g., gaze location, estimated accommodation, etc.) using the estimated position. In some embodiments the scanning laser assembly includes a plurality of scanning lasers and the photodetector assembly includes a plurality of photodetectors. In these cases, there are plurality of unique views of the eye such that eye tracking system performs multiview (i.e., multiple images of the eye at different perspectives in a single frame) and/or stereo imaging of the eye.

In some embodiments, the eye tracking system is part of a (HMD). In addition to the eye tracking system, the HMD includes an electronic display panel, and an optics block. The estimated eye position and/or additional information may be used by the HMD to e.g., adjust a location of an image plane at which content is presented to a user, performed foveated rendering, some other action that is based in part on estimated eye position, or some combination thereof. In some embodiments, the HMD may be part of an artificial reality system.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a HMD connected to a host computer system, a standalone HMD, a mobile device or computing system, or any other hardware platform capable of providing artificial reality content to one or more viewers.

Head-Mounted Display Overview

FIG. 1A is a diagram of a HMD 100, in accordance with one embodiment. Externally, the HMD 100 includes a front rigid body 105 and a band 110. Internally, the front rigid body 110 includes a plurality of locators 115, an inertial measurement unit (IMU) 120, a reference point 125, and position sensors 130. For perspective, the faces of the HMD are labeled left side 135A, front side 135B, right side 135C, bottom side 135D, and top side 135E.

The locators 115 are objects located in specific positions in the HMD 100 relative to one another and a specific reference point on the HMD 100. Each locator may be a light emitting diode (LED), a corner cube reflector, a reflective marker, a type of light source that contrasts with the operating environment of the HMD 100, or some combination thereof. The locators 115 are discussed in detail below with regard to FIG. 4.

The IMU 120 is an electronic device that generates IMU data based on measurement signals received from the position sensors 130. A position sensor 130 generates one or more measurement signals in response to motion of the HMD 100. Examples of position sensors 130 include: one or more accelerometers, one or more gyroscopes, one or more magnetometers, another suitable type of sensor that detects motion, a type of sensor used for error correction of the IMU 120, or some combination thereof. The position sensors 130 may be located external to the IMU 120, internal to the IMU 120, or some combination thereof.

The reference point 125 is a point that may be used to describe the position of the HMD 100. While the reference point may generally be defined as a point in space; however, in practice the reference point 125 is defined as a point within the HMD 100 (e.g., a center of the IMU 120).

Based on the one or more measurement signals from one or more position sensors 130, the IMU 120 generates IMU data indicating an estimated position of the HMD 100 relative to an initial position of the HMD 100. For example, the position sensors 130 include multiple accelerometers to measure translational motion (forward/back, up/down, left/right) and multiple gyroscopes to measure rotational motion (e.g., pitch, yaw, and roll). In some embodiments, the IMU 120 rapidly samples the measurement signals and calculates the estimated position of the HMD 100 from the sampled data. For example, the IMU 120 integrates the measurement signals received from the accelerometers over time to estimate a velocity vector and integrates the velocity vector over time to determine an estimated position of a reference point on the HMD 100.

Figure 1B:
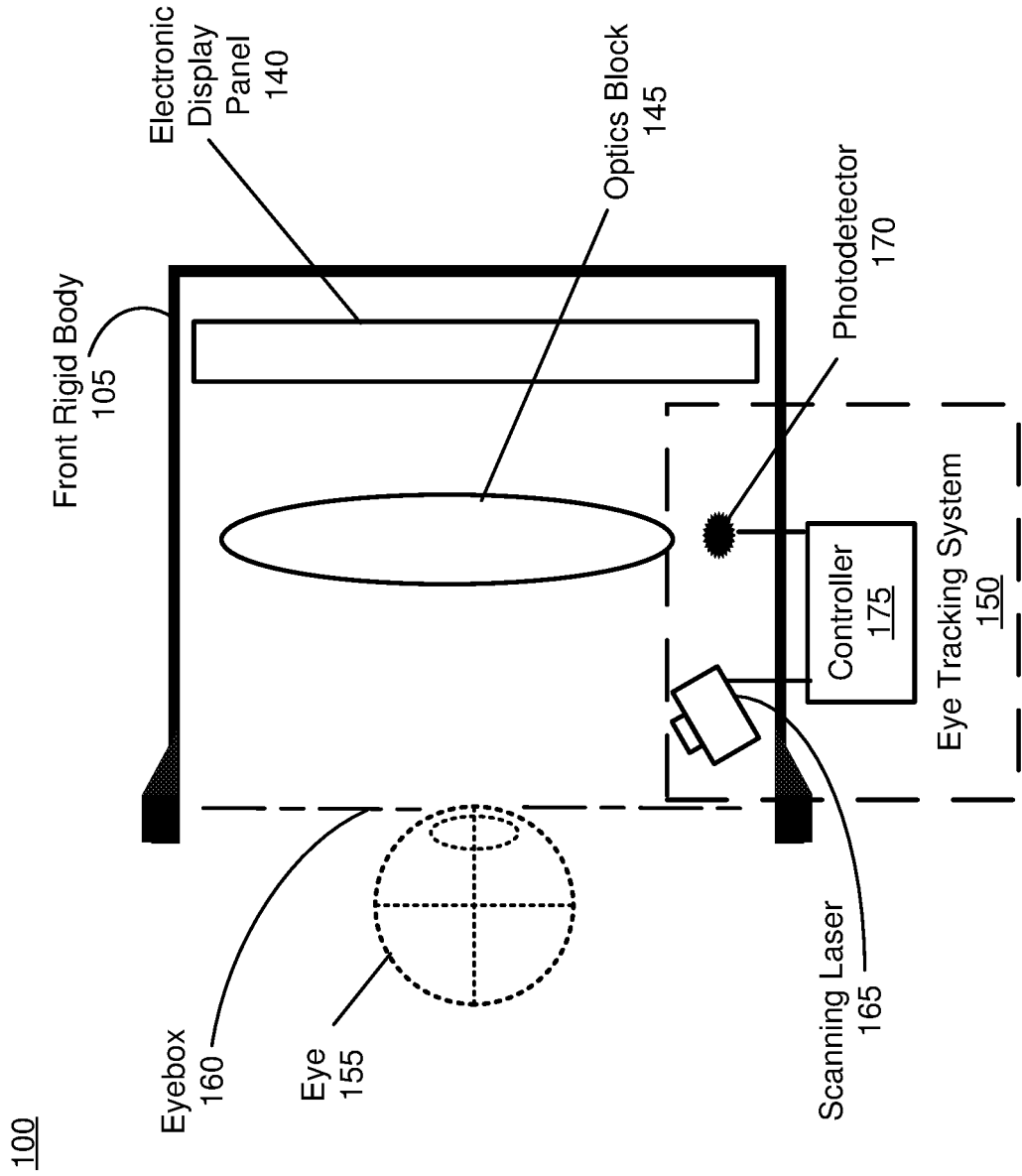
FIG. 1B is a cross-section of a front rigid body of the HMD in FIG. 1A, in accordance with one embodiment.

FIG. 1B is a cross section of the front rigid body 105 of the HMD 100 shown in FIG. 1A, according to an embodiment. The front rigid body 105 includes an electronic display panel 140, an optics block 145, and an eye tracking system 150. Although FIG. 1B depicts a center cross-section of the eye 155, the center cross-section of the eye 155 and the eye tracking system 150 do not have to be in the same place. An additional electronic display panel 140 and optics block 145, separate from those shown in FIG. 1B, may be included in the front rigid body 105 to present content to another eye of the user.

The electronic display panel 140 displays images and/or video to the user as a generated by the HMD 100 or another device. In particular, the electronic display panel 140 emits image light toward the optics block 145. Examples of the electronic display panel 140 include: a liquid crystal display (LDC), an organic light-emitting diode display (OLED), an active-matrix organic light-emitting diode display (AMO-LED), a transparent organic light-emitting diode display (TOLED), some other display, or some combination thereof.

The optics block 145 magnifies received image light from the electronic display panel 140, corrects optical errors associated with the image light, and presents the corrected image light to a user of the HMD 100. The optics block 145 directs the magnified and/or corrected image light to an eyebox 160 for presentation to a user wearing the HMD 100. The eyebox 160 is a location in space that would be occupied by an eye 155 of a user of the HMD 100.

In one embodiment, the optics block 145 includes one or more optical elements and/or combinations of different optical elements. For example, an optical elements and/or combinations of different optical elements. For example, an optical element is an aperture, a Fresnel lens, a convex lens, a concave lens, a filter, or any other suitable optical elements that affects the image light emitted from the electronic display panel 140. In some embodiments, one or more of the optical elements in the optics block 145 may have one or more coatings, such as anti-reflective coatings.

Magnification of the image light by the optics block 145 allows the electronic display panel 140 to be physically smaller, weigh less, and consume less power than larger displays. Additionally, magnification may increase a field of view of the displayed content. For example, the field of view of the displayed content is such that the displayed content is presented using almost all (e.g., 110 degrees diagonal), and in some cases all, of the user's field of view. In some embodiments, the optics block 145 is designed so its effective focal length is larger than the spacing to the electronic display panel 140, which magnifies the image light projected by the electronic display panel 140. Additionally, in some embodiments, the amount of magnification is adjusted by adding or removing optical elements.

In some embodiments, the optics block 145 is designed to correct one or more types of optical errors. Examples of optical errors include: two-dimensional optical errors, three-dimensional optical errors, or some combination thereof. Two-dimensional errors are optical aberrations that occur in two dimensions. Example types of two-dimensional errors include: barrel distortion, pincushion distortion, longitudinal chromatic aberration, transverse chromatic aberration, or any other type of two-dimensional optical error. Three-dimensional errors are optical errors that occur in three dimensions. Example types of three-dimensional errors include spherical aberration, comatic aberration, field curvature, astigmatism, or any other type of three-dimensional optical error. In some embodiments, content provided to the electronic display panel 140 for display is pre-distorted, and the optics block 145 corrects the distortion when it receives image light from the electronic display panel 140 generated based on the content.

The eye tracking system 150 tracks a position of the eye 155. The eye tracking system 150 comprises a scanning laser 165 of a scanning laser assembly, a photodetector 170 of a photodetector assembly, and a controller 175. Although FIG. 1B only shows one eye 155 of the user. In some embodiments, separate eye tracking systems may be implemented for each eye of the user.

The scanning laser assembly scans a beam of light emitted from the scanning laser 165 throughout some or all of the eyebox 160. In this embodiment, the scanning laser assembly includes a single laser 165. However, in alternate embodiments (not shown) the scanning laser assembly may include multiple scanning lasers. In FIG. 1B, for a given eye channel (i.e., left eye or right eye) the scanning laser 165 is configured to illuminate a portion of the eyebox 160 with a beam of scanned laser light. The scanning laser 165 emits laser light in a band of light that is not visible to a human eye. For example, in some embodiments, the beam of scanned laser light is in the infrared. The scanning laser 165 scans the eyebox 160 in two dimensions over a portion of the eye 155. For example, oscillating along a first axis and steering along a second axis, which is orthogonal to the first axis. In some embodiments, the first axis is the x-axis of the field of vision and the second axis is the y-axis field of vision.

Because the eye 155 is a specular surface, a mirror-like surface capable of reflecting waves of light, some portion of the infrared light of the scanning laser 165 is reflected towards the photodetector 170 for a given orientation of the eye 155 and emission angle from the scanning laser 165.

The photodetector assembly includes one or more photodetectors, including the photodetector 170, that are sensitive to light emitted from the scanning laser 165. A photodetector may be, e.g., a photo diode, a photo transistor, avalanche photodiode, an active-pixel sensor, HgCdTe detector, some other device that is sensitive to light emitted from the scanning laser 165, or some combination thereof. In some embodiments, some or all of the one or more photodetectors in the photodetector assembly include a filter that passes light in a band (e.g., IR) emitted by the scanning laser 165, and attenuates light in other bands (e.g., visible).

In some embodiments, the front rigid body 105 further comprises a varifocal module (not shown in FIG. 1B). The varifocal module may adjust focus of one or more images displayed on the electronic display panel 140, based on the eye tracking information. In one embodiment, the varifocal module adjusts focus of the displayed images and mitigates vergence-accommodation conflict by adjusting a focal distance of the optics block 145 based on the determined eye tracking information. In another embodiment, the varifocal module adjusts focus of the displayed images by performing foveated rendering of the one or more images based on the determined eye tracking information. In yet another embodiment, the varifocal module utilizes the depth information from the controller 175 to generate content for presentation on the electronic display panel 140.

Figure 2:
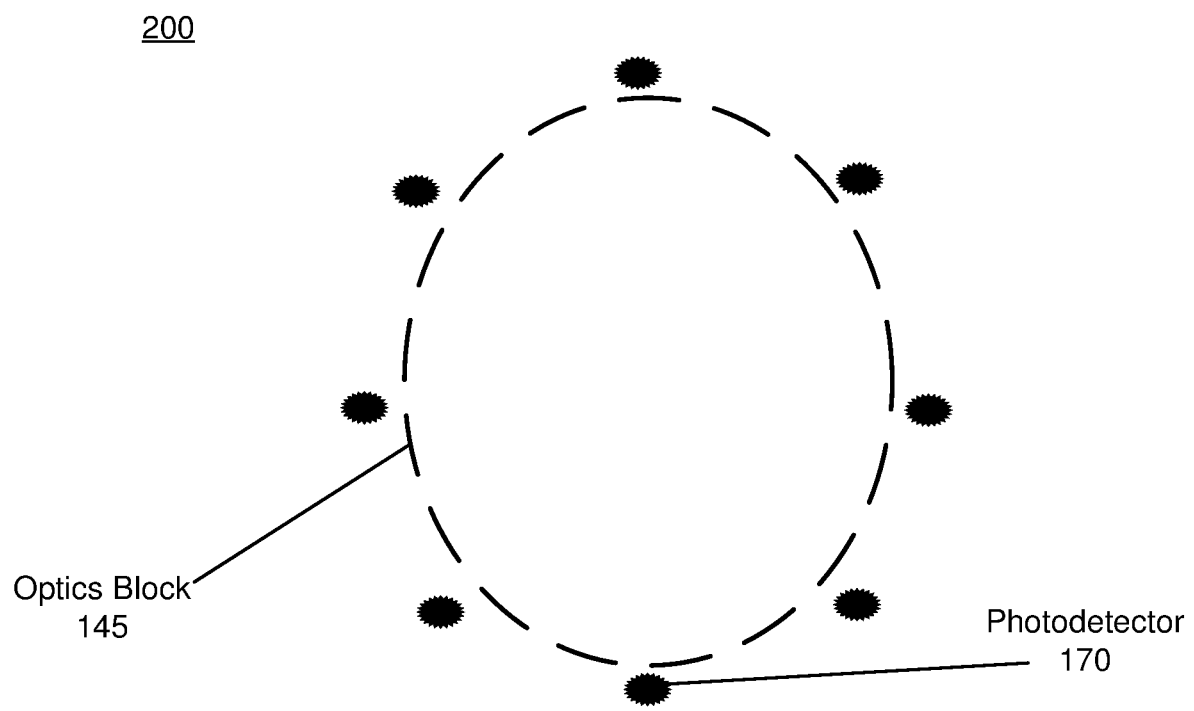
FIG. 2 is a front view of an optics block and a photodetector assembly, in accordance with one embodiment.

FIG. 2 is a front view of a photodetector assembly 200, according to an embodiment. The photodetector assembly 200 is an embodiment of the photodetector assembly discussed above with reference to FIG. 1B. The photodetector assembly 200 comprises a plurality of photodetectors positioned along and adjacent to a perimeter of the optics block 145.

Figure 3:
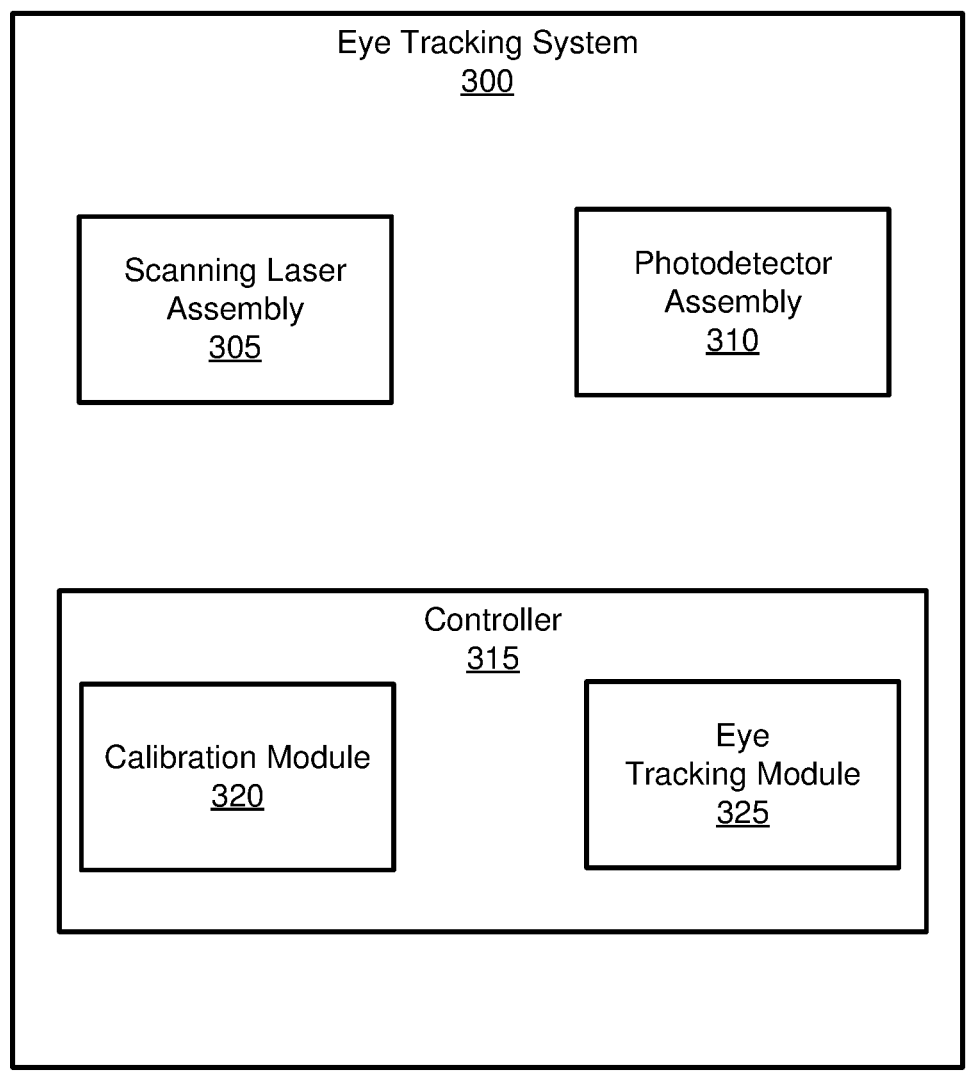
FIG. 3 is a block diagram of an eye tracking system including a scanning laser and a photodetector assembly, in accordance with one embodiment.

FIG. 3 is a block diagram of an eye tracking system 300, in accordance with one embodiment. The eye tracking system 300 comprises a scanning laser assembly 305, a photodetector assembly 310, and a controller 315. The eye tracking system 150 is an embodiment of the eye tracking system 300. And the photodetector assembly discussed above with reference to FIG. 1B is an embodiment of the photodetector assembly 310, and the controller 175 is an embodiment of the controller 315. In other embodiments, the eye tracking system 300, comprises additional or fewer devices than those described herein. Similarly, the functions can be distributed among different entities in a different manner than is described here.

The scanning laser assembly 305 scans one or more beams of light throughout some or all of the eyebox 160. The scanning laser assembly 305 includes one or more scanning lasers (e.g., the scanning laser 165) that emit laser light toward an eyebox (e.g., the eyebox 160). A scanning laser emits laser light in a band of light invisible to a human eye, for example in the infrared. In some embodiments, the scanning laser oscillates along a first axis, the x-axis, and steers along a second axis, the y-axis, orthogonal to the first. A portion of the reflected scanning laser's laser light reflects towards the photodetector 170 with an emission angle to determine the orientation of an eye (e.g., the eye 155). In some embodiments, scanning is performed continuously over the eyebox, incrementally moving from side to side in either direction (e.g., raster scanning). In alternate embodiments, scanning is performed discontinuously, incrementing across the eyebox in a single direction. In other embodiments the scanning is performed locally over specific regions of the eyebox. For example, once a position of an eye is determined in the eyebox, the scanning laser assembly 305 may scan in accordance with instructions from the controller 315 a portion of the eyebox that moves with the user's eye orientation (versus scanning the entire eyebox).

The photodetector assembly 310 includes one or more photodetectors, which are sensitive to the emitted light from the scanning laser assembly 305. In some embodiments, the photodetector assembly 310 includes a single photodetector (e.g. the photodetector 170), placed at the edge of an optics block (e.g., the optics block 145). In alternate embodiments, the photodetector assembly 310 includes a plurality of photodetectors that are arranged around the perimeter of the optics block, e.g., as shown in FIG. 2. Note that in some embodiments multiple photodetectors and/or multiple emitters are used to extend a range over which the photodetector assembly 310 can capture corneal reflections during a scan of the eye. An additional advantage of using multiple photodetectors and/or emitters is that it increases a probability of the photodetector assembly 310 capturing reflections from the eye. In addition to capturing specular reflections, the photodetector assembly 310 comprising one or more photodetectors may capture reflections across diffuse surfaces. Note that a number of unique views may be determined by multiplying the number of photodetectors in the photodetector assembly 310 by a number of scanning lasers in the scanning laser assembly 305. Note that different unique views allow for multiview and/or stereo imaging. The controller 315 provides instructions to the scanning laser and the photodetector assembly 310 to determine the estimated position of the user's eye. The controller 315 stores information that allows the measured signal intensities from the photodetector assembly 310 to provide insight as to the approximate position of one or both eyes of a user. The controller 315 comprises a calibration module 320 and an eye tracking module 325. In other embodiments, the controller 315 comprises additional or fewer modules than those described herein. Similarly, the functions can be distributed among the modules and/or different entities in a different manner than is described here.

The calibration module 320 updates a model M during a calibration sequence. In some embodiments, the model M is a three-dimensional (3D) model of a portion of the eye, including a cornea, an iris, a pupil, a sclera, an anterior chamber, some other portion of the eye, or some combination thereof. The model M describes a geometry of the selected portion of the eye, in addition to other aspects of the portion of the eye. Further, the model M describes a position of the eye with six degrees of freedom, accordingly, the model M also describes an orientation of the eye. For example, the model M may include acceleration vectors and/or velocity vectors for the eye that describe movement of the eye. In some embodiments, the calibration model 320 generates a model M prior to eye tracking using a set of training data comprising measured signal intensities and known positions of the eye. In other embodiments in which both of a user's eyes are scanned, the calibration module 320 may generate two model's $M_1$ and $M_2$: one for each eye.

The calibration sequence implemented by the calibration module 320 may involve instructing the scanning laser assembly 305 to emit infrared imaging light and have the photodetector assembly 310 detect the reflected imaging light from the eye as it focuses on known locations. In one embodiment, the user is instructed to look at a certain object (e.g. a virtual icon) that is displayed on an electronic display (e.g. of an HMD) and the photodetector assembly 310 detects light reflected from the eye while the user is looking at the object. The location of the object can be displayed at different locations, such that the eye tracking system 300 can record signal intensities of the reflected light at multiple known orientations. The recorded signal intensities can be interpolated into model M. Once the calibration module 320 has produced M, an eye tracking can be performed. In general, because eye tracking with a model M is trained for a specific user's eye, eye tracking with the model is more accurate than eye tracking without the model. In some embodiments, the calibration module 320 continues to update M during tracking. In some embodiments, the system may begin tracking with a nominal model M based on statistical norms of human eyes and the calibration module 320 updates M during tracking.

In some embodiments, the model, M, may include of a number of parameters to approximate the shape of the eye, for example the radius of the eye, an average radius of the sclera of the eye, a set of three parameters to approximate the shape of the sclera as a ellipsoid, a radius of the cornea of the eye, a measurement of the protrusion of the cornea from the sclera, a set of parameters specifying the shape of the cornea, and a point of rotation for the eye. Additional parameters may be used to account for deviations from the ideal model specified by the parameters, for example a bulge on the eye's surface caused by a blood vessel.

The eye tracking module 325 stores information for the eye tracking system 300, which may include tracking instructions, emission parameters, a model M of a user's eye, eye tracking information, or some combination thereof and provides the tracking instructions to the scanning laser assembly 305 and the photodetector assembly 310. Tracking instructions control the scanning laser assembly 305 and the photodetector assembly 310 and synchronize the scanning laser assembly 305 and the photodetector assembly 310 such that all reflected light will be detected by the photodetector assembly 310. The tracking instructions are generated using emission parameters, which may be determined to increase signal-to-noise ratio of the reflected imaging light.

Additionally, the eye tracking module 325 determines a position of one or both eyes of the user using signal intensities recorded by the photodetector assembly 310. The measured signal intensities are used in conjunction with the model M to estimate the position of the eye. For example, at a pre-determined position, the photodetector assembly 310 captures and measures signal intensities created by the emitted light and the controller 315 uses the captured intensities to look up the estimated position of the eye from a record detailing the relationships between different signal intensities and the position of the eye.

In some embodiments, the eye tracking module 325 controls what portion of the eyebox is scanned by the scanning laser assembly 305. As noted above, the eye tracking module 325 determines a position of the eye. In some embodiments, the eye tracking module 325 instructs the scanning laser assembly 305 to scan the entire eyebox— also referred to as a full scan—to determine eye position. In some embodiments, once a location of the eye is determined using the full scan, the eye tracking module 325 determines a portion of the eyebox that includes the cornea of the eye, and instructs the scanning laser assembly 305 to scan the determined portion of the eyebox—also referred to as a limited scan. In some embodiments, the eye tracking module 325 determines a predicted position of the cornea of the eye (e.g., based on eye velocity and/or acceleration), and determines the portion of the eyebox based on the predicted position. The eye tracking module 325 instructs the scanning laser assembly 305 to scan the determined portion of the eyebox. In this manner, the eye tracking system 300 is able to scan a portion of the eyebox and the location of the portion tracks with movement of the user's eye, and specifically, with movement of the cornea.

HMD System

Figure 4:
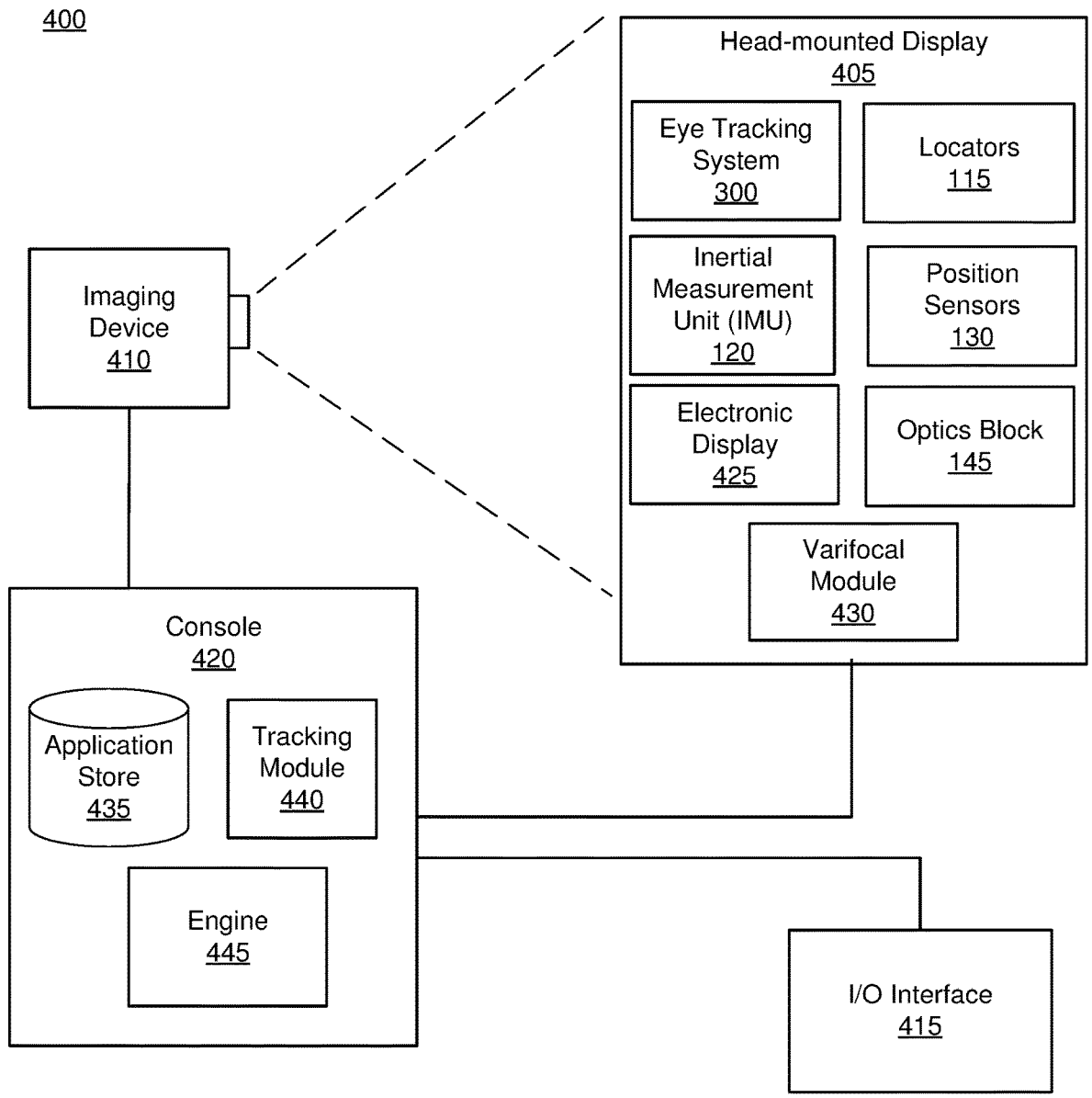
FIG. 4 is a block diagram of an HMD system including a scanning laser and a photodetector assembly, in accordance with one embodiment.

FIG. 4 is a HMD system 400 in accordance with one embodiment. The system 400 may be used as an artificial reality system. The system 400 includes an HMD 405, an imaging device 410, and an I/O interface 415, which are each coupled to a console 420. While FIG. 4 shows a single HMD 405, a single imaging device 410, and a single I/O interface 415, in other embodiments, any number of these components may be included in the system. For example, there may be multiple HMDs 400, each having an associated I/O interface 415 and being monitored by one or more imaging devices 410, with each HMD 405, I/O interface 415, and imaging devices 410 communicating with the console 420. In other embodiments, different and/or additional components may also be included in the system 400.

The HMD 405 may act as an artificial reality HMD. In some embodiments, the HMD 405 augments views of a physical, real-world environment with computer-generated elements (e.g., images, video, sound, etc.). The HMD 405 presents content to a user. In some embodiments, the HMD 100 is an embodiment of the HMD 405. Example content includes images, video, audio, or some combination thereof. Audio content may be presented via a separate device (e.g., speakers and/or headphones) external to the HMD 405 that receives audio information from the HMD 405, the console 420, or both. The HMD 405 includes one or more locators 115, the inertial measurement unit (IMU) 120, the position sensors 130, the electronic display panel 140, the optics block 145, and the eye tracking system 150.

The locators 115 are objects located in specific positions on the HMD 405 relative to one another and relative to a specific reference point on the HMD 405. The locators 115 are an embodiment of the locators 405. A locator 115 may be a light emitting diode (LED), a corner cube reflector, a reflective marker, a type of light source that contrasts with an environment in which the HMD 405 operates, or some combination thereof. Active locators (i.e., an LED or other type of light emitting device) may emit light in the visible band (~380 nm to 750 nm), in the infrared (IR) band (~440 nm to 1700 nm), in the ultraviolet band (10 nm to 380 nm), some other portion of the electromagnetic spectrum, or some combination thereof.

The locators 115 can be located beneath an outer surface of the HMD 405, which is transparent to the wavelengths of light emitted or reflected by the locators 115 or is thin enough not to substantially attenuate the wavelengths of light emitted or reflected by the locators 115. Further, the outer surface or other portions of the HMD 405 can be opaque in the visible band of wavelengths of light. Thus, the locators 115 may emit light in the IR band while under an outer surface of the HMD 405 that is transparent in the IR band but opaque in the visible band.

As described above with reference to FIG. 1A, the IMU 120 is an electronic device that generates IMU data based on measurement signals received from one or more of the position sensors 130, which generate one or more measurement signals in response to motion of HMD 405. Examples of the position sensors 130 include accelerometers, gyroscopes, magnetometers, other sensors suitable for detecting motion, correcting error associated with the IMU 120, or some combination thereof.

Based on the measurement signals from the position sensors 130, the IMU 120 generates IMU data indicating an estimated position of the HMD 405 relative to an initial position of the HMD 405. For example, the position sensors 130 include multiple accelerometers to measure translational motion (forward/back, up/down, left/right) and multiple gyroscopes to measure rotational motion (e.g., pitch, yaw, and roll). The IMU 120 can, for example, rapidly sample the measurement signals and calculate the estimated position of the HMD 405 from the sampled data. For example, the IMU 120 integrates measurement signals received from the accelerometers over time to estimate a velocity vector and integrates the velocity vector over time to determine an estimated position of a reference point on the HMD 405. The reference point is a point that may be used to describe the position of the HMD 405. While the reference point may generally be defined as a point in space, in various embodiments, a reference point is defined as a point within the HMD 405 (e.g., a center of the IMU 120). Alternatively, the IMU 120 provides the sampled measurement signals to the console 420, which determines the IMU data.

The IMU 120 can additionally receive one or more calibration parameters from the console 420. As further discussed below, the one or more calibration parameters are used to maintain tracking of the HMD 405. Based on a received calibration parameter, the IMU 120 may adjust one or more of the IMU parameters (e.g., sample rate). In some embodiments, certain calibration parameters cause the IMU 120 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

The electronic display 425 displays 2D or 3D images to the user in accordance with data received from the console 420. In various embodiments, the electronic display 425 comprises a single electronic display panel (e.g., the electronic display panel 140) or multiple electronic display panels (e.g., an electronic display panel for each eye of a user). Examples of the electronic display panel may include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a waveguide display, some other display, or some combination thereof.

The optics block 145 magnifies image light received from the electronic display panel 140, corrects optical errors associated with the image light, and presents the corrected image light to a user of the HMD 405. The optics block 145 includes a plurality of optical elements. Example optical elements included in the optics block 145 include: an aperture, a Fresnel lens, a convex lens, a concave lens, a filter, a reflecting surface, a feature waveguide, or any other suitable optical element that affects image light. Moreover, the optics block 145 may include combinations of different optical elements. In some embodiments, one or more of the optical elements in the optics block 145 may have one or more coatings, such as partially reflective or anti-reflective coatings.

The eye tracking system 300 determines eye tracking information associated with one or both eyes of a user wearing the HMD 405. The eye tracking information determined by the eye tracking system 300 may comprise information about an orientation of the user's eye, i.e., information about an angle of an eye-gaze. The eye tracking system 300 includes a scanning laser assembly 305 that illuminates one or both eyes of the user with infrared light. A photodetector assembly 310 captures the light reflected by a portion of the eye(s) being tracked. The eye tracking system 300 determines a position of the eye(s) being tracked with up to six degrees of freedom as discussed in detail above with regard to FIG. 3. The eye tracking system 300 then determines eye tracking information using the determined position(s). For example, given a position of an eye the eye tracking system 300 can determine a gaze angle.

In some embodiments, the varifocal module 430 is further integrated into the HMD 405. The varifocal module 430 may be coupled to the eye tracking system 150 to obtain eye tracking information determined by the eye tracking system 150. The varifocal module 430 may be configured to adjust focus of one or more images displayed on the electronic display panel 140, based on the determined eye tracking information obtained from the eye tracking system 150. In this way, the varifocal module 430 can mitigate vergence-accommodation conflict in relation to image light. The varifocal module 430 can be interfaced (e.g., either mechanically or electrically) with at least one of the electronic display panel 140 and at least one optical element of the optics block 145. Then, the varifocal module 430 may be configured to adjust focus of the one or more images displayed on the electronic display panel 140 by adjusting position of at least one of the electronic display panel 140 and the at least one optical element of the optics block 145, based on the determined eye tracking information obtained from the eye tracking system 300. By adjusting the position, the varifocal module 430 varies focus of image light output from the electronic display panel 140 towards the user's eye. The varifocal module 430 may be also configured to adjust resolution of the images displayed on the electronic display panel 140 by performing foveated rendering of the displayed images, based at least in part on the determined eye tracking information obtained from the eye tracking system 300. In this case, the varifocal module 430 provides appropriate image signals to the electronic display panel 140. The varifocal module 430 provides image signals with a maximum pixel density for the electronic display panel 140 only in a foveal region of the user's eye-gaze, while providing image signals with lower pixel densities in other regions of the electronic display panel 140.

The imaging device 410 generates imaging data in accordance with calibration parameters received from the console 420. Imaging data includes one or more images showing observed positions of the locators 115 that are detectable by imaging device 410. The imaging device 410 may include one or more cameras, one or more video cameras, other devices capable of capturing images including one or more locators 115, or some combination thereof. Additionally, the imaging device 410 may include one or more filters (e.g., for increasing signal to noise ratio). The imaging device 410 is configured to detect light emitted or reflected from the locators 115 in a field of view of the imaging device 410. In embodiments where the locators 115 include passive elements (e.g., a retroreflector), the imaging device 410 may include a light source that illuminates some or all of the locators 115, which retro-reflect the light towards the light source in the imaging device 410. Imaging data is communicated from the imaging device 410 to the console 420, and the imaging device 410 receives one or more calibration parameters from the console 420 to adjust one or more imaging parameters (e.g., focal length, focus, frame rate, ISO, sensor temperature, shutter speed, aperture, etc.).

The I/O interface 415 is a device that allows a user to send action requests to the console 420. An action request is a request to perform a particular action. For example, an action request may be to start or end an application or to perform a particular action within the application. The I/O interface 415 may include one or more input devices. Example input devices include a keyboard, a mouse, a game controller, or any other suitable device for receiving action requests and communicating the received action requests to the console 420. An action request received by the I/O interface 415 is communicated to the console 420, which performs an action corresponding to the action request. In some embodiments, the I/O interface 415 may provide haptic feedback to the user in accordance with instructions received from the console 420. For example, haptic feedback is provided by the I/O interface 415 when an action request is received, or the console 420 communicates instructions to the I/O interface 415 causing the I/O interface 415 to generate haptic feedback when the console 420 performs an action.

The console 420 provides content to the HMD 405 for presentation to the user in accordance with information received from the imaging device 410, the HMD 405, or the I/O interface 415. In the example shown in FIG. 4, the console 420 includes an application store 435, a tracking module 440, and an engine 445. Some embodiments of the console 420 have different or additional modules than those described in conjunction with FIG. 4. Similarly, the functions further described below may be distributed among components of the console 420 in a different manner than is described here.

The application store 435 stores one or more applications for execution by the console 420. An application is a group of instructions, that when executed by a processor, generates content for presentation to the user. Content generated by an application may be in response to inputs received from the user via movement of the HMD 405 or the I/O interface 415. Examples of applications include gaming applications, conferencing applications, video playback application, or other suitable applications.

The tracking module 440 calibrates the system 400 using one or more calibration parameters and may adjust one or more calibration parameters to reduce error in determining position of the HMD 405. For example, the tracking module 440 adjusts the focus of the imaging device 410 to obtain a more accurate position for observed locators 115 on the HMD 405. Moreover, calibration performed by the tracking module 440 also accounts for information received from the IMU 120. Additionally, if tracking of the HMD 405 is lost (e.g., imaging device 410 loses line of sight of at least a threshold number of locators 115), the tracking module 440 re-calibrates some or all of the system 400 components.

Additionally, the tracking module 440 tracks the movement of the HMD 405 using imaging information from the imaging device 410 and determines positions of a reference point on the HMD 405 using observed locators from the imaging information and a model of the HMD 405. The tracking module 440 also determines positions of the reference point on the HMD 405 using position information from the IMU information from the IMU 120 on the HMD 405. Additionally, the tracking module 440 may use portions of the IMU information, the imaging information, or some combination thereof, to predict a future location of the HMD 405, which is provided to the engine 445.

The engine 445 executes applications within the system 400 and receives position information, acceleration information, velocity information, predicted future positions, or some combination thereof for the HMD 405 from the tracking module 440. Based on the received information, the engine 445 determines content to provide to the HMD 405 for presentation to the user, such as a virtual scene, one or more virtual objects to overlay onto a real world scene, etc. Additionally, the engine 445 performs an action within an application executing on the console 420 in response to an action request received from the I/O interface 415 and provides feedback to the user that the action was performed. The provided feedback may be visual or audible feedback via the HMD 405 or haptic feedback via I/O interface 415.

In some embodiments, the engine 445 estimates one or more future positions of the HMD 405 using the IMU data from the HMD 405. The engine 445 generates warping parameters based on the one or more estimated future positions, and provides 445 the warping parameters to the HMD 405 with the content.

In some embodiments, based on the eye tracking information (e.g., orientation of the user's eye) received from the eye tracking system 300, the engine 445 determines resolution of the content provided to the HMD 405 for presentation to the user on the electronic display panel 140. The engine 445 provides the content to the HMD 405 having a maximum pixel resolution on the electronic display panel 140 in a foveal region of the user's gaze, whereas the engine 445 provides a lower pixel resolution in other regions of the electronic display panel 140, thus achieving less power consumption at the HMD 405 and saving computing cycles of the console 420 without compromising a visual experience of the user. In some embodiments, the engine 445 can further use the eye tracking information to adjust where objects are displayed on the electronic display panel 140 to prevent vergence-accommodation conflict.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A head-mounted display (HMD) comprising:
   an electronic display configured to emit image light;
   an optics block including one or more optical elements configured to direct the image light to an eyebox, the eyebox being a region in space that is occupied by an eye of a user of the HMD; and
   an eye tracking system comprising:
      a scanning laser assembly configured to directly illuminate a portion of the eyebox with a beam of scanned laser light;
      a detector configured to detect reflections of the scanned light from an eye in the eyebox; and
      controller configured to:
         determine a position of the eye using a model and the detected reflections of scanned light, and the model maps the detected reflections of the scanned light to the position of the eye,
         wherein the controller is configured to calibrate the model to the user using signal intensities of some of the detected reflections that are detected for different known orientations of the eye, and the controller is configured to interpolate the signal intensities for the different known orientations to calibrate the model to the user.

2. The HMD of claim 1, wherein the scanning laser assembly emits light in an infrared band of light.

3. The HMD of claim 2, wherein the scanning laser assembly scans the eyebox in at least two-dimensions.

4. The HMD of claim 3, wherein the scanning laser assembly includes a scanning laser that oscillates along a first axis and steers along a second axis that is orthogonal to the first axis.

5. The HMD of claim 1, wherein the detector further comprises an array of detectors placed around a perimeter of the optics block.

6. The HMD of claim 1, wherein the model is a mapping of signal intensities at the detector for various emission angles of the scanning laser to different eye positions.

7. The HMD of claim 1, wherein the detector further includes a filter that attenuates light outside of a band of light emitted by the scanning laser.

8. The HMD of claim 1, wherein the HMD is configured to adjust an image displayed on the electronic display based on the determined position of the eye.

9. An eye-tracking system comprising:
   a scanning laser assembly configured to directly illuminate a portion of the eyebox with a beam of scanned laser light;
   a detector configured to detect reflections of the scanned light from an eye in the eyebox; and
   a controller configured to:
      determine a position of the eye using a model and the detected reflections of scanned light, and the model maps the detected reflections of the scanned light to the position of the eye,
      wherein the controller is configured to calibrate the model to the user using signal intensities of some of the detected reflections that are detected for different known orientations of the eye, and the controller is configured to interpolate the signal intensities for the different known orientations to calibrate the model to the user.

10. The eye-tracking system of claim 9, wherein the scanning laser assembly emits light in an infrared band of light.

11. The eye-tracking system of claim 10, wherein the scanning laser assembly scans the eyebox in at least two-dimensions.

12. The eye-tracking system of claim 11, wherein the scanning laser includes a scanning laser that oscillates along a first axis and steers along a second axis that is orthogonal to the first axis.

13. The eye-tracking system of claim 9, wherein the detector further comprises an array of detectors placed around a perimeter of the optics block.

14. The eye-tracking system of claim 9, wherein the model is a mapping of signal intensities at the detector for various emission angles of the scanning laser assembly to different eye positions.

15. The eye-tracking system of claim 9, wherein the detector further includes a filter that attenuates light outside of a band of light emitted by the scanning laser assembly.

16. The eye-tracking system of claim 9, wherein the eye tracking system is a component of a head-mounted display.

* * * * *